Sept. 10, 1957 L. E. W. MONTROSE-OSTER 2,806,191
ELECTRIC MOTOR DRIVING ARRANGEMENT
Filed May 4, 1953
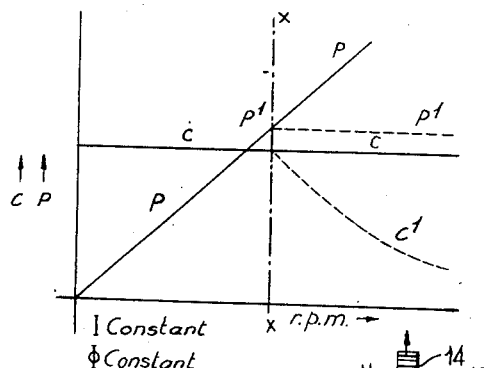
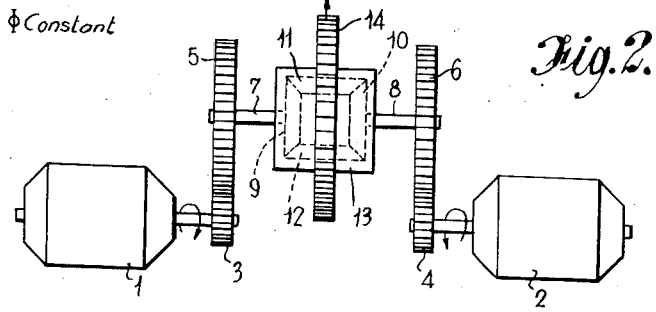
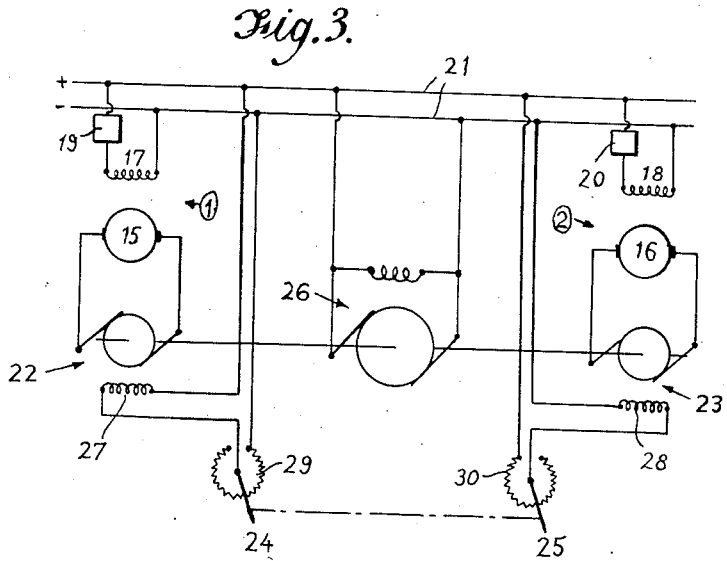
Inventor
Louis Eugene Widolf Montrose-Oster
By [signature]
Attorney

2,806,191

ELECTRIC MOTOR DRIVING ARRANGEMENT

Louis Eugene Widolt Montrose-Oster, Brussels-Boitsfort, Belgium, assignor to Pollopas Patents Limited, London, England, a British company Application May 4, 1953, Serial No. 352,884

Claims priority, application Great Britain November 2, 1948

7 Claims. (Cl. 318—8)

The present invention relates to an electric motor driving arrangement and is a continuation-in-part of my application Serial No. 124,152, filed October 28, 1949, now patent No. 2,695,586, dated Nov. 30, 1954.

The electric motor driving arrangement according to this invention is particularly suitable for use where it is necessary to produce a high torque at low angular speeds and even when the output member of the driving arrangement is stationary, and/or where it is necessary periodically to start and stop or reverse the direction of rotation or movement of heavy masses at short intervals of time. Thus, for example, the arrangement is particularly suitable for driving the movable weight of a ship stabilising equipment in which the weight is reciprocated back and forth to produce a stabilising couple which counteracts the influencing factors which tend to cause the ship to roll. The arrangement is also particularly suitable for driving sheet metal rolling machines or other machines where heavy masses have to be started and stopped at frequent intervals. The arrangement also solves the problem of producing a constant tractive effort or pull on a member, for example on a cable which is alternately unwound and wound up, or which remains stationary under load, as is required for cranes, bucket-grabs and the like. The driving arrangement can also of course be used for other purposes even though full use may not be made of the advantages presented by the invention.

Considerable energy losses occur in apparatus in which heavy masses have to be started and stopped at frequent intervals of time. Firstly, the energy invested during acceleration is usually dissipated in the form of heat during braking. Secondly, in normal electric motor driving arrangements, energy losses also arise in the starter equipment, which losses become particularly important in installations where the mass has to be started and stopped at frequent intervals. These latter losses can be reduced by employing a Ward-Leonard converter system preferably incorporating a fly-wheel-accumulator as proposed by Ilgner, which converter levels out the energy peaks and maintains the energy consumption at a substantially constant value.

An object of the invention is to provide an electric motor driving arrangement for apparatus which has to be repeatedly started and stopped, which will produce a high torque, at different speeds and in both directions, and if desired even when the output member of the driving arrangement is stationary, and in which the losses are reduced to a minimum.

The specification of my above-mentioned copending application Serial No. 124,152 describes an electric motor driving arrangement comprising two D. C. shunt motors for driving in opposite directions the two input members of a differential so that the output member of the differential will turn in one direction or the other according to the relative speeds of the two motors. The motor speeds have been varied by changing the intensity of the excitation of one or both of the motors. The present invention provides an improvement over that arrangement in that the magnetising fields or excitation of the motors are maintained constant and the speed of the output member is varied by changing the voltage across the armature of one or both of the motors. This arrangement has the advantage that the driving couple exerted by the motor will remain substantially constant at all speeds so long as the intensity of the current across the armatures is kept constant, and consequently the efficiency of the whole arrangement is improved. It also enables the energy supplied during the period of acceleration to be regenerated during the period of deceleration.

In order that the invention may be more clearly understood reference will now be made to the accompanying drawings, in which:

Fig. 1 is a diagram showing the characteristic curves of a D. C. shunt-wound electric motor.

Fig. 2 is a diagrammatic view of the mechanical arrangement of one embodiment of the invention, Fig. 3 is an electrical circuit of the arrangement illustrated in Fig. 2.

The diagram of Fig. 1 shows curves indicating the relationship between the torque or couple exerted by a direct current shunt-wound electric motor at different speeds, and also the power at different speeds, it being assumed that the current flowing through the armature and also the exciter current are maintained constant. As is shown by the full line curve C, the couple exerted by a direct current electric motor remains constant for all speeds so long as the intensity of the magnetic field $\Phi$ and of the current I in the armature remain constant. The couple increases as a function of any current increase in the armature and diminishes as a function of any reduction of the flux $\Phi$. It does not depend on the speed (R. P. M.) of the motor to which the power P (as shown by the full line curve P) is directly proportional so long as the magnetic field $\Phi$ and the current I in the armature remain constant.

Assume the line X—X indicates the normal operating conditions of a direct current/shunt motor which produces the power $P^1$ when turning at its normal speed with the prescribed potential at its terminals. If the current I flowing through the armature and the intensity $\Phi$ of the magnetising flux have been maintained constant from zero speed up to normal speed, the couple C produced will at all times have had the same value.

If in order to increase the speed the intensity of the magnetising field $\Phi$ is reduced, the power $P^1$ remains constant but the couple decreases. This is indicated by the dotted-line curves $P^1$, $C^1$ to the right of the line X—X.

If, on the contrary, the voltage across the armature is increased, the speed and the power will increase whilst the couple produced will remain constant, it being assumed that the intensity of the current in the armature is maintained constant. The couple produced will increase as a function of any increase in the current intensity passing through the armature, and will be independent of the motor speed.

By feeding the armature with a voltage which is variable at will, it is theoretically possible to produce unlimited power, together with a constant couple without effective overload; and of even producing, intermittently, a much greater couple to meet an effective overload. The fraction by which the current intensity exceeds the intensity corresponding to the rated power is proportional to this overload.

This method of varying the motor speed by varying the voltage at its armature terminals whilst maintaining the magnetic flux $\Phi$ at a constant value, possesses numerous advantages over the method of speed variation by varying the flux $\Phi$ and maintaining the voltage at the armature terminals constant. It is only by means of this "variable armature voltage" method that the speed and couple can be increased, either separately or simultaneously, which conditions are necessary for the economic operation of the arrangement according to the invention which allows a high torque, and even the maximum torque, to be produced both when the output members of the driving arrangement is stationary as well as moving.

Figs. 2 and 3 show one embodiment of the invention. The arrangement comprises two direct current dynamo-electric machine (D. C. motors) 1 and 2 which rotate in opposite directions, the shafts of these two machines driving, through the reduction gears 3, 5 and 4, 6 respectively, the two input shafts 7, 8 of a differential gear. The gears 9 and 10 of the differential which are coupled respectively with the shafts 7, 8 engage in known manner with the gears 11, 12 acrried by the cage 13 of the differential. The cage has a toothed wheel 14 secured thereto whereby the movements of the cage 13 may be transmitted to the mechanism to be driven.

Fig. 3 shows a circuit diagram of the machines. The constant exciting flux of the two machines is ensured by the field windings 17, 18 being fed from a source of direct current of constant potential indicated by the conductors 21. The field rheostats 19 and 20 enable the fluxes in the two machines to be adjusted to the desired values.

The armatures 15, 16 of the two machines are fed from a source of direct current in such a manner that the potentials across the armatures may be adjusted to different values over a wide range. For example, each of the armatures may be fed from individual dynamos 22, 23 driven at constant speed by a D. C. dynamo electric machine 26 fed from the supply conductors 21, the field windings 27, 28 of the dynamos being excited from the constant voltage D. C. supply conductors 21, through field rheostats 29, 30 respectively controlled by the levers 24, 25 respectively. If desired the two levers 24, 25 may be interconnected so that the potential delivered by one dynamo will be increased upon a decrease of the potential delivered by the other dynamo and vice-versa. The possible potential variation should extend over a wide range, for example ±100%. Instead of employing individual dynamos, the variable D. C. potentials applied to the armatures 15, 16, may be derived from batteries, rectifiers, or in any other convenient manner.

By reason of the machines 1 and 2 rotating in opposite directions, as indicated by the arrows, the cage 13 and the toothed wheel 14 fixed to it will remain stationary so long as two machines turn at the same speed. When one of the machines turns more quickly than the other, the cage 13 of the differential executes an angular movement in the same direction as that one of the shafts which has the greater speed. The speed of the cage will depend on the following law which is valid for all differentials $$\frac{R. P. M. (7) \pm R. P. M. (8)}{2} = R. P. M. (13)$$

But it is not sufficient that the cage should execute an angular movement. The cage must be able to transmit a powerful couple capable of effecting rapid acceleration of heavy masses. This is achieved with the apparatus according to the invention in the following manner.

If it be assumed that the toothed wheel 14 is to effect a reciprocating movement (for example of a part of a machine tool, or of a sheet rolling mill, or a pithead elevator, or some other similar device) and that the differential is driven by two direct current machines in the manner illustrated in Fig. 3, the starting of the cage 13, for example in the direction of the arrow shown in Fig. 2 will take place when the angular speed of the armature 15 of machine 1 becomes greater than that of the armature 16 of the machine 2. This difference of angular speed between the two machines can be obtained either by increasing the potential across the armature 15 or by diminishing the potential across the armature 16, or preferably by a combination of the two.

Whichever of these methods are employed, the intensity of the magnetic field of the two machines will be maintained constant at its optimum value. The couple produced by the armature 15 will be directly proportional to the intensity of the current passing through its armature which will be a function of the potential applied to its terminals. When armature 15 turns faster than the armature 16, it will tend to accelerate the latter. To enable the intensity of the current flowing through the armature 15 to increase in order to produce, at the shaft 7, a couple which can produce a couple of twice this value at the cage 13, it is necessary not only to prevent the armature 16 from accelerating by reason of the increased speed of the armature 15 but also, if possible, to retard it.

According to the laws which are valid for all differentials the following relationships between the couples C and the power P at the different shafts are as follows:

$$C\ (7) = C\ (8) = \frac{C\ (13)}{2}$$

$$P\ (7) \pm P\ (8) = P\ (13)$$

$$P\ (7) : P\ (8) = R.\ P.\ M.\ (7) : R.\ P.\ M.\ (8)$$

In order to brake the armature 16 with reference to the armature 15 it is necessary still further to increase the potential at the terminals of the armature 15 or to reduce the potential applied to the armature 16, or preferably simultaneously to increase the potential across the armature 15 and reduce the potential across the armature 16. The machine 2 will then change from operating as an electric motor to operating as an electric generator. The couple applied by the action of the armature 15 finds itself as a reaction at the armature 16, which restores energy to the current source 21.

In order to turn the cage 13 in the other direction of rotation, it suffices to vary the potentials applied to the armatures 15 and 16 in the opposite directions.

It follows from what has been previously described that the current intensities in the two armatures (operating respectively as motor and generator) will be approximately of the same value (the difference representing internal losses). The intensities are in effect determined by the magnetic fields and the couples. The values of the former are constant and the values of the latter are necessarily equal for the two machines. However, the power absorbed or given out respectively by the two machines are related as a function of their speeds as indicated above.

According to the direction of rotation of the cage 13, the machine operating as a motor must be capable of furnishing the power required to drive the cage and also that restored by the other machine operating as a generator. Since this latter power is restored to the current source, the necessary effective power corresponds only to that required to drive the cage 13, plus internal losses.

It will be seen that the starting and variation of speed of the cage 13 is effected without losses in special starter apparatus, and that the system functions within limits which extend, in the two directions of rotation, from zero speed of the cage (when the shafts 7 and 8 rotate at equal speeds) up to half the speed of shaft 7 or 8 (if it be assumed that the other shaft is stopped). The couple available at the cage will always be double the couple available at one of the shafts 7 or 8.

The variation of the potentials at the terminals of the armatures 15 and 16 will be effected according to requirements. The invention not only enables the cage 13 to be accelerated gradually to any speed, from a maximum positive speed (in one direction) to a maximum negative speed (in the opposite direction) while passing through zero, but also enables current regeneration, during the period of deceleration, of practically all the energy supplied during the period of acceleration, less internal electrical and mechanical losses of the motors and the differential system.

Deceleration can be achieved in several ways, for example in any of the three following manners:

1. By restoring the potential at the terminals of the armatures 15, 16 gradually to those values corresponding to the stationary condition of the cage 13. This method enables current regeneration to be obtained almost up to the point at which the active force of the moving mass ceases to exist.

2. By reducing still further the potential at the terminals of the machine which is operating as a generator, and then reducing the potential to the machine which was operating as a motor. Whilst the speed of the first machine will diminish almost up to the point of stopping, the second machine will turn as a generator almost up to the point at which the active force of the moving mass ceases to exist. This method enables regeneration to be achieved during the descent of a mass, as for example in the case of a crane.

3. By reducing the potential applied to the terminals of the machine turning as a motor and increasing the potential at the terminals of the machine operating as a generator. By inverting their functions, the machines create a powerful couple opposite to the direction of rotation of the cage 13, which produces an immediate braking action. In this case there will be consumption of energy, instead of regeneration.

It will be understood that various modifications may be made without departing from the scope of the invention. Thus, as has already been indicated, it suffices to change the angular speed of only one of the machines of the apparatus, in which case one of the two machines can turn at a constant speed.

I claim:

1. High-torque electric motor driving arrangement comprising two direct current dynamo-electric machines each capable of operating as a generator as well as a motor and each having a field winding, an armature mounted on a driving shaft for movement within the electric field created by said field winding, and a winding on said armature, a differential having two input members and an output member, means coupling the driving shaft of one of said two machines to one of said two input members, means coupling the driving shaft of the second machine to the second of said two input members, means supplying a substantially constant direct current to the field winding of said one machine, means supplying a substantially constant direct current to the field winding of said other machine, a source of direct current, means including a first voltage varying device for feeding current from said source across the armature of one machine, means including a second voltage varying device for feeding current from said source across the armature of the other machine, said voltage varying devices being capable of varying the voltages applied across said armatures over wide ranges so as to change the speeds of said machines both above and below their normal speeds and thereby cause the output member to move, said feeding means including said voltage varying devices permitting current flow therethrough in both directions, whereby the current generated by the machine which is running at the slower speed and is being driven as a generator by the machine running at the higher speed will be fed back to the said source.

2. Arrangement as claimed in claim 1, wherein the means coupling each driving shaft to an input member includes a reduction gear.

3. Arrangement as claimed in claim 1, wherein the first and second voltage varying devices are arranged to vary the voltages applied to the respective armatures simultaneously and in opposite directions.

4. High-torque electric motor driving arrangement comprising two direct current dynamo-electric machines each capable of operating as a generator as well as a motor and each having a field winding, an armature mounted on a driving shaft for movement within the electric field created by said field winding, and a winding on said armature, a differential having two input members and an output member, means coupling the driving shaft of one of said two machines to one of said two input members, means coupling the driving shaft of the second machine to the second of said two input members, means connecting said field windings to a substantially constant D. C. source, two D. C. dynamos each having an armature and a field winding, said dynamo armatures being connected respectively to the armatures of said machines, and said dynamo field windings being excited from said D. C. source, means for varying the excitation respectively of said two dynamos over ranges which will vary the potentials delivered by said dynamos over wide ranges, and means for driving said dynamos at substantially constant speeds.

5. Arrangement as claimed in claim 4, wherein the means for varying the excitation of the two dynamos are coupled together for simultaneous operation in opposite directions.

6. Arrangement as claimed in claim 4, wherein the means coupling the driving shafts to the input members of the differential each includes a reduction gear.

7. High-torque electric motor driving arrangement comprising two direct current dynamo-electric machines each capable of operating as a generator as well as a motor, a differential having two input members and an output member, said machines driving the two input members of said differential in such manner that the machines will, when operating as motors at their normal speeds, drive the two input members at such speeds and in such directions that the output member of the differential will remain stationary, means for maintaining the magnetising fields of said machines substantially constant, means which permit current flow in both directions therethrough connecting the armatures of said machines to a source of direct current, and means for varying the direct current voltages applied to said armatures respectively over a wide range, whilst keeping substantially equal the currents flowing through said armatures, so as to change the speeds of said machines to speeds both above and below their normal speeds and thereby cause the output member of the differential to move in one direction or the other, the machine running at the slower speed being driven as a generator by the other machine and the generated current being fed back to said source.

References Cited in the file of this patent

UNITED STATES PATENTS

| | | |
|---|---|---|
| 2,436,582 | Lear | Feb. 24, 1948 |
| 2,443,657 | King | June 22, 1948 |
| 2,487,429 | Edwards | Nov. 8, 1949 |
| 2,613,878 | Hailey | Oct. 14, 1952 |